US006257636B1

(12) United States Patent
Hovis et al.

(10) Patent No.: US 6,257,636 B1
(45) Date of Patent: Jul. 10, 2001

(54) SELF-ACTUATING MECHANICAL GRAPPLE FOR LIFTING AND HANDLING OBJECTS

(75) Inventors: Gregory L. Hovis, North Augusta, SC (US); Carl T. Etheredge, Jr., Tuscaloosa, AL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/585,538

(22) Filed: Jun. 2, 2000

(51) Int. Cl.[7] ................................ B25J 15/10; B66C 1/66

(52) U.S. Cl. .................................... 294/110.1; 294/82.32; 294/116

(58) Field of Search ................................ 294/82.32, 86.2, 294/86.27, 86.29, 86.3, 86.33, 88, 106, 110.1, 110.2, 115, 116

(56) References Cited

U.S. PATENT DOCUMENTS

| | | | | |
|---|---|---|---|---|
| 1,841,721 | * | 1/1932 | Esary et al. | 294/116 |
| 2,397,554 | * | 4/1946 | Lontz | 294/116 |
| 3,012,811 | * | 12/1961 | Sandrock | 294/110.1 |
| 4,253,695 | | 3/1981 | Blaive et al. . | |
| 4,279,699 | | 7/1981 | Kuhn . | |
| 4,395,069 | | 7/1983 | Lebret . | |
| 4,498,573 | * | 2/1985 | Anderson et al. | 294/116 X |
| 4,637,645 | | 1/1987 | Eriksson . | |
| 4,666,200 | * | 5/1987 | Walker et al. | 294/110.2 |
| 4,948,187 | | 8/1990 | Blaseck . | |
| 5,120,100 | | 6/1992 | Doty . | |
| 5,131,705 | * | 7/1992 | Gluck et al. | 294/82.32 |
| 5,161,845 | | 11/1992 | Carpenter, Jr. . | |
| 5,171,053 | | 12/1992 | Rouleau . | |
| 5,244,338 | | 9/1993 | White . | |

FOREIGN PATENT DOCUMENTS

| | | |
|---|---|---|
| 893 389 A2 | 1/1999 | (EP) . |

* cited by examiner

*Primary Examiner*—Johnny D. Cherry
(74) *Attorney, Agent, or Firm*—James C. Durkis; Virginia B. Caress; Paul A. Gottlieb

(57) ABSTRACT

A self-actuating mechanical grapple for lifting and handling an object includes a support housing with upper and lower portions and defining an internal recess. The lower portion of the housing includes a bottom opening which communicates with the recess. Preferably, two or three grapple jaws are provided, the first end portions of which are connected to the housing and the second end portions thereof remain free for engaging an object. The grapple jaws are pivotable between open and closed positions. An actuator member is slidably positioned in the recess for opening and closing the jaws, and includes a cam portion in operative engagement with the first end portions of the jaws in a manner to pivot the jaws when the actuator member moves axially relative to the housing. The actuator member includes a rotatable member with at least one contact member. A locking member or logic ring includes grooves defining open and closed positions of the jaws and is fixedly mounted to the internal surface of the housing and cooperates with the rotatable member. A plunger member is axially movable in the housing for contacting an object and includes at least one stud member for immovably engaging the contact member.

20 Claims, 7 Drawing Sheets

SELF-ACTUATING MECHANICAL GRAPPLE FOR LIFTING AND HANDLING OBJECTS

This invention was made with Government support under contract No. DE-AC09-96SR18500 awarded by the U.S. Department of Energy. The Government has certain rights in the invention.

FIELD AND HISTORICAL BACKGROUND OF THE INVENTION

The present invention is directed to lifting and handling devices, and more particularly to a self-actuating mechanical grapple for lifting and handling objects.

Various types of devices for lifting and handling objects are currently available in the art as shown in U.S. Pat. Nos. 4,253,695; 4,279,699; 4,395,069; 4,637,645; 4,948,187; 5,120,100; 5,161,845; 5,171,053; 5,244,338; and European EP 893,389.

The conventional devices are, however, complex and require various strings, tension mechanisms, and/or electro-mechanical components to actuate. Accordingly, there is a need in the industry for a simple mechanical grapple device which does not require any active electromechanical components, is easy to operate and simple to manufacture.

OBJECT AND SUMMARY OF THE INVENTION

The principal object of the present invention is to provide a self-actuating mechanical grapple for lifting and handling objects which overcomes the drawbacks associated with the conventional devices.

Another object of the present invention is to provide a self-actuating mechanical grapple for lifting and handling objects which is simple in design and requires a fewer number of parts.

Yet another object of the present invention is to provide a self-actuating mechanical grapple for lifting and handling objects which is inherently more reliable since it does not require any active components, has fewer parts, and is actuated by its own weight.

An additional object of the present invention is to provide a self-actuating mechanical grapple for lifting and handling objects which converts axial motion to internal rotation of various components that control the logic for opening and closing the grapple jaws. The device of the present invention is therefore very effective and easy to operate in lifting and handling various objects.

In accordance with the present invention, a self-actuating mechanical grapple for lifting and handling an object includes a support housing with upper and lower portions and defining an internal recess. The lower portion of the housing includes a bottom opening which communicates with the recess. Preferably, two or three grapple jaws are provided, the first end portions of which are connected to the housing and the second end portions thereof remain free for engaging an object. The grapple jaws are pivotable between open and closed positions. An actuator member is slidably positioned in the recess for opening and closing the jaws, and includes a cam portion in operative engagement with the first end portions of the jaws in a manner to pivot the jaws when the actuator member moves axially relative to the housing. The actuator member includes a rotatable member with at least one contact member. A locking member or logic ring includes grooves defining open and closed positions of the jaws and is fixedly mounted to the internal surface of the housing and cooperates with the rotatable member. A plunger member is axially movable in the housing for contacting an object and includes at least one stud member for immovably engaging the contact member.

BRIEF DESCRIPTION OF THE DRAWINGS

The above and other objects, novel features and advantages of the present invention will become apparent from the following detailed description of the invention as illustrated in the drawings, in which:

FIGS. 6A–10A are graphical illustrations of the relationship between various components of the grapple at different positions shown in corresponding FIGS. 6–10.

DETAILED DESCRIPTION OF THE INVENTION

Figure 1:
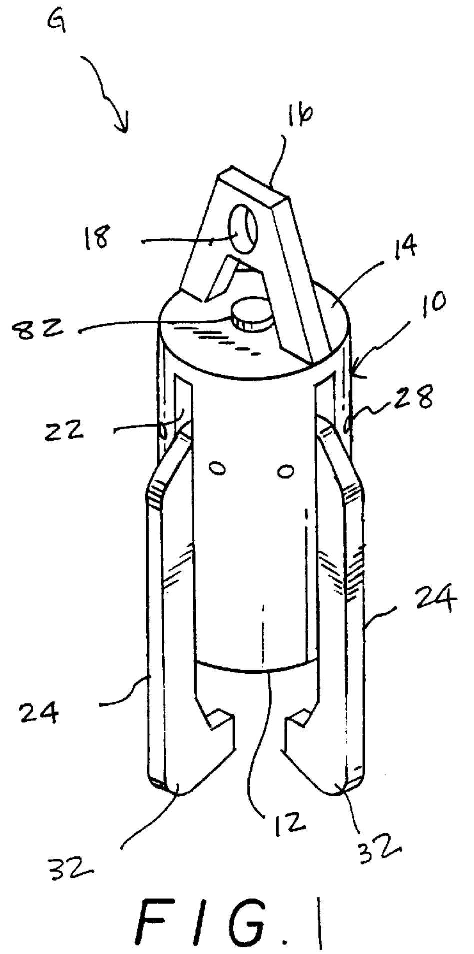
FIG. 1 is a perspective view of the grapple of the present invention.
Figure 2:
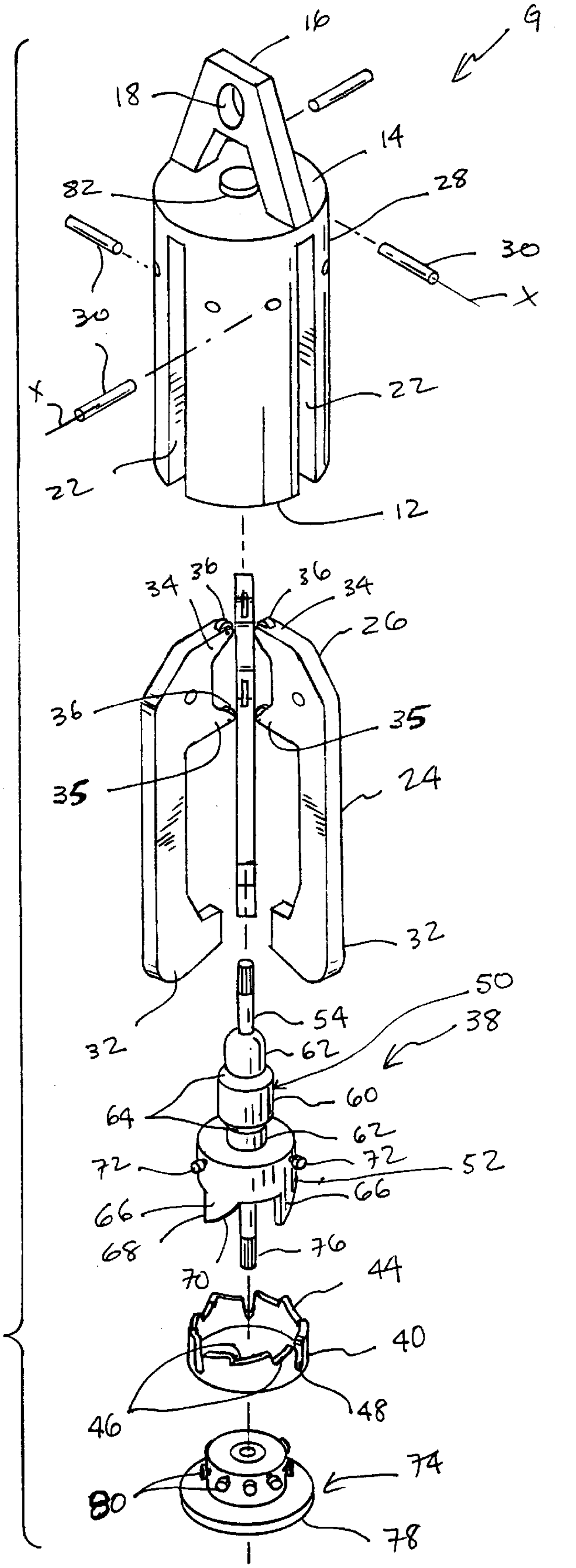
FIG. 2 is an exploded view of the grapple shown in FIG. 1.

As best shown in FIGS. 1–2, the grapple G of the present invention includes a generally cylindrical frame or housing 10 having a bottom opening 12 and a closed top 14. A hook 16, including a lifting eye 18, is provided for carrying the grapple G by a crane hook or the like (not shown). The housing 10 defines therein an internal recess 20 communicating with the exterior through the bottom opening 12 (FIG. 5), and includes vertically extending grooves 22 for receiving, preferably three jaws 24. (It is noted that the grapple can have two, or more than three jaws.) The upper end portions 26 of the jaws 24 are pivotably mounted in the upper portion 28 of the housing 10 by conventional pins 30. As best shown in FIG. 2, the jaws 24 are preferably equilaterally arranged about the periphery of the housing 10 in a manner that the lower portions 32 of the jaws 24 extend below the bottom opening 12 of the housing 10 and remain free to contact an object O (FIG. 5).

The upper portions 26 of the jaws 24 include upper and lower contact portions 34 and 35, respectively, with bearings 36 that slidably engage the actuator assembly 38.

Figure 5:
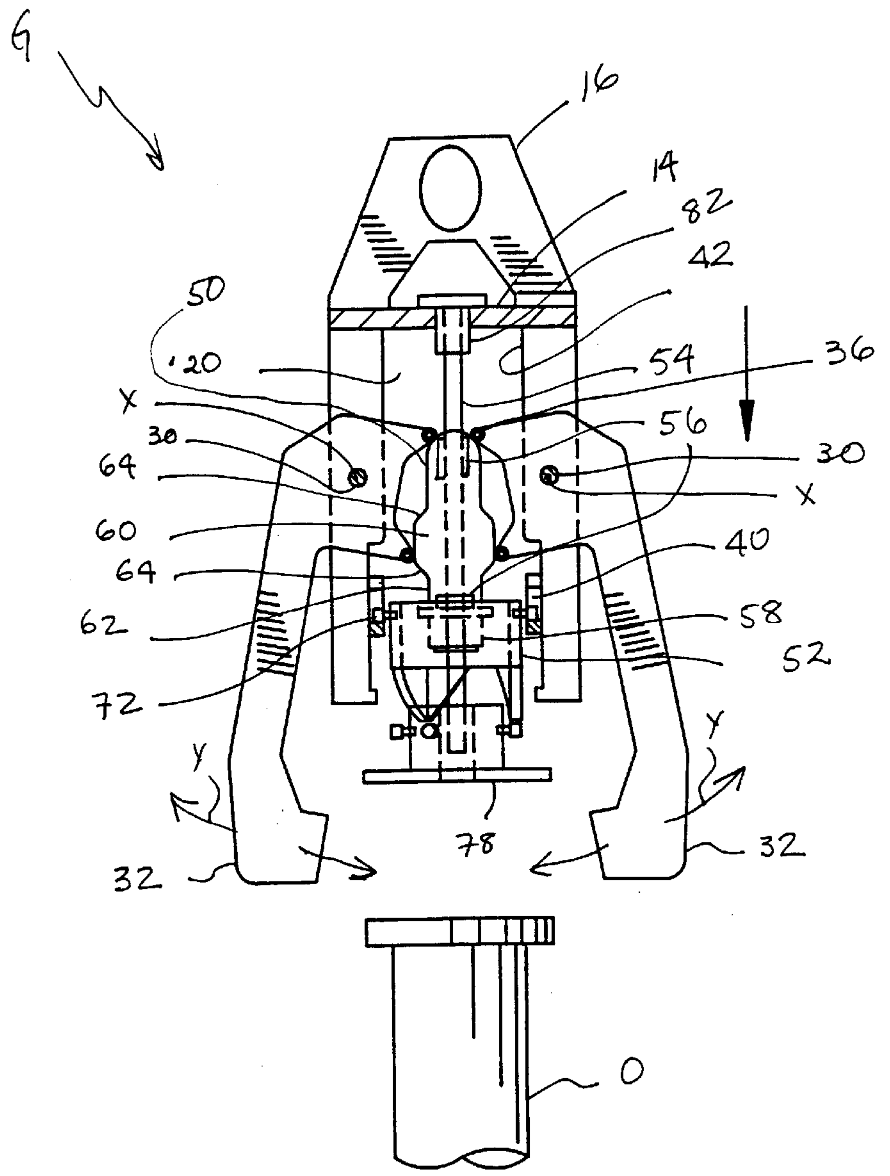
FIGS. 5–11 are sectional views illustrating the operation of the grapple of the invention.
Figure 3:
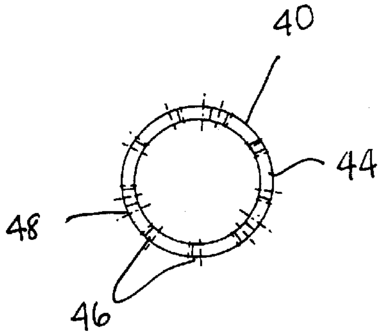
FIG. 3 is a top view of the logic ring.
Figure 4:
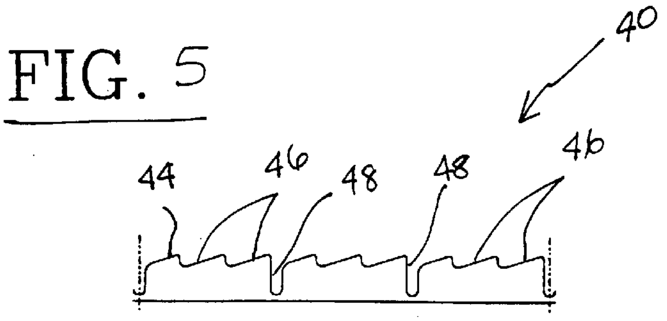
FIG. 4 is an unrolled view of the logic ring showing series of repeating units of shallow and deep grooves.

As shown in FIGS. 2–5, a logic or lock ring 40 is concentrically, fixedly mounted onto the internal peripheral surface 42 of the housing 10. The lock ring 40 includes a series of repeating grooves on its top surface 44. As best shown in FIGS. 2 and 4, the top surface 44 includes a repeating series of preferably two shallow grooves 46 defining the closed position of the jaws 24 (FIG. 10), and one deep groove 48 defining the open position of the jaws 24 (FIG. 5). (It is noted that the invention is applicable to have only one deep groove and one shallow groove. However, two shallow grooves are preferable for safety reasons.)

The actuator assembly 38 includes an upper generally cylindrically-shaped jaw actuator 50 and a lower rotator member 52. The jaw actuator 50 and rotator 52 are concentrically aligned with respect to each other and within the internal recess 20 of the housing 10. Although the jaw actuator 50 and the rotator 52 are free to move axially along a spline shaft 54, they are coupled to each other in a manner that there is no relative axial motion therebetween. Further, the jaw actuator 50 cannot rotate due to a spline bearing 56; however, the rotator 52 is arranged in a manner that it can rotate about the shaft 54 due to a roller bearing 58 (FIG. 5).

The jaw actuator 50 includes a larger diameter section 60 connected to the smaller diameter portion 62 by ramps 64. As explained in more detail below, the bearings 36 provided on the upper and lower contact portions 34 and 35 of the jaws 24, ride up and down the ramp 64, between the larger and smaller diameter sections 60 and 62 to cause the jaws 24 to pivot about the longitudinal axes X of the pins 30. As the jaws pivot about axes X, the lower portions 32 thereof reciprocate in a direction shown by arrow Y in FIG. 5. In this manner, the larger diameter section 60 functions as a cam.

Figure 6:
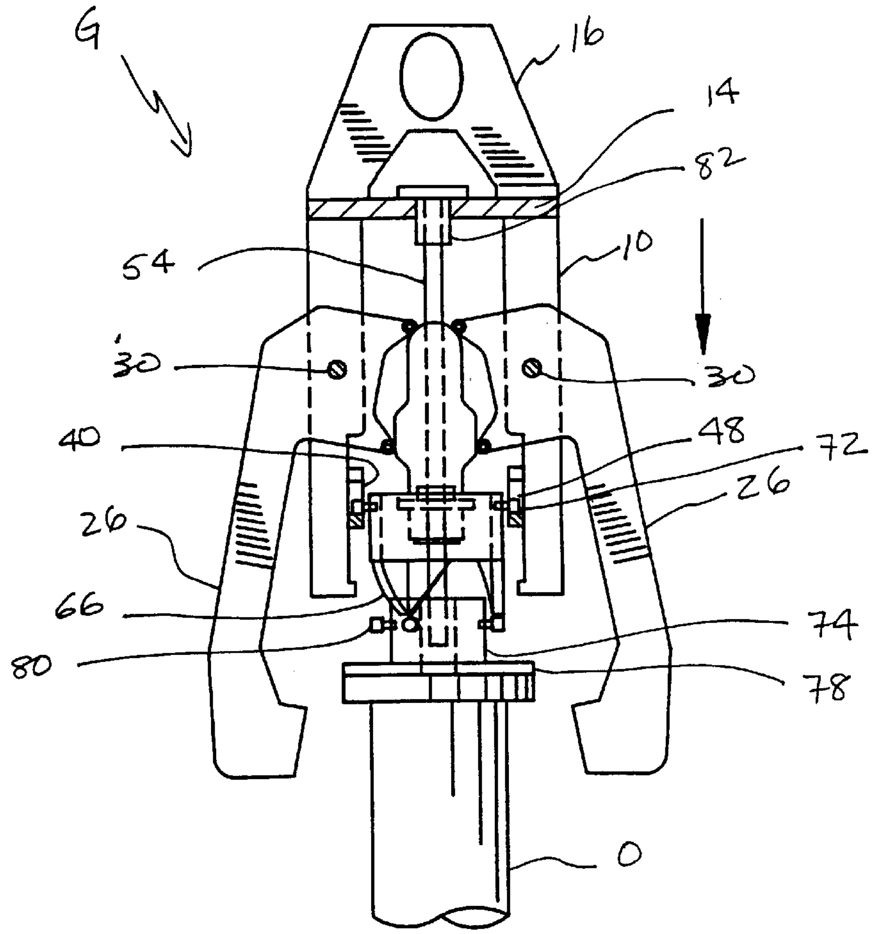
Figure 6A:
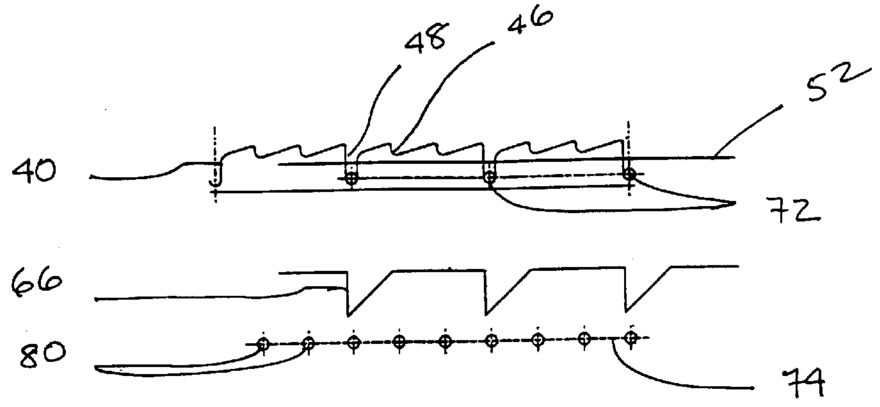

As shown in FIG. 2, the rotator 52 is provided with preferably three downwardly extending, generally triangularly-shaped contact members 66 arranged equilaterally about the periphery thereof. Each contact member 66 includes a generally straight edge 68 and an inclined edge 70 (FIG. 6A). Preferably, three stud bearings 72 are equilaterally arranged on the rotator 52 for riding in the grooves 46 and 48.

As further best shown in FIG. 2, a plunger 74 is mounted at the bottom end 76 of the shaft 54. The plunger 74 includes a lower disc 78 for contacting the object O, and is provided with stud bearings 80 about the periphery thereof. The plunger 74 is disposed in a concentric relationship to the actuator assembly 38 and the housing 10, and is free to move up and down axially relative to the housing 10. The plunger 74, however, does not rotate due to a spline bearing 82 fixedly mounted in the top 14 (FIG. 5).

OPERATION

The operation of the grapple G of the present invention will now be described. As shown in FIG. 5, the grapple G, which is in an open position of the jaws 24, is lowered towards an object O to be lifted. The grapple G is further lowered until the disk 78 of the plunger 74 contacts the object O (FIG. 6). As shown in FIG. 6A, the stud bearings 72 of the rotator 52 are received in the deep grooves 48 of the lock ring 40. Further, the contact members 66 do not yet engage the stud bearings 80 of the plunger 74.

Figure 7:
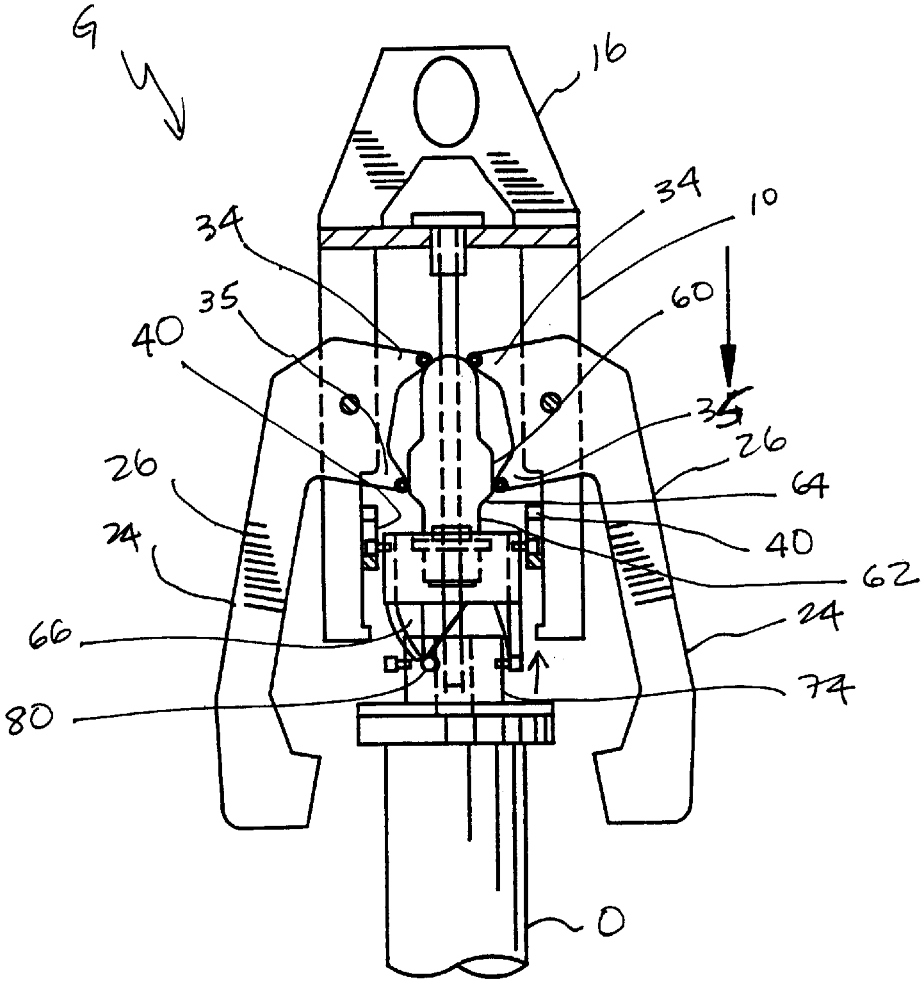
Figure 7A:
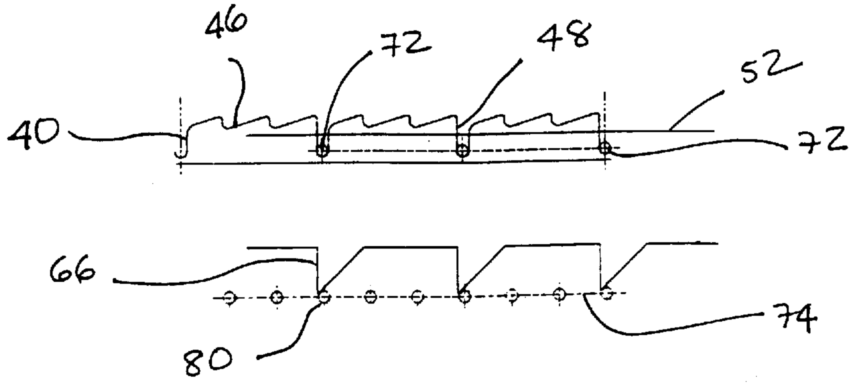
Figure 8:
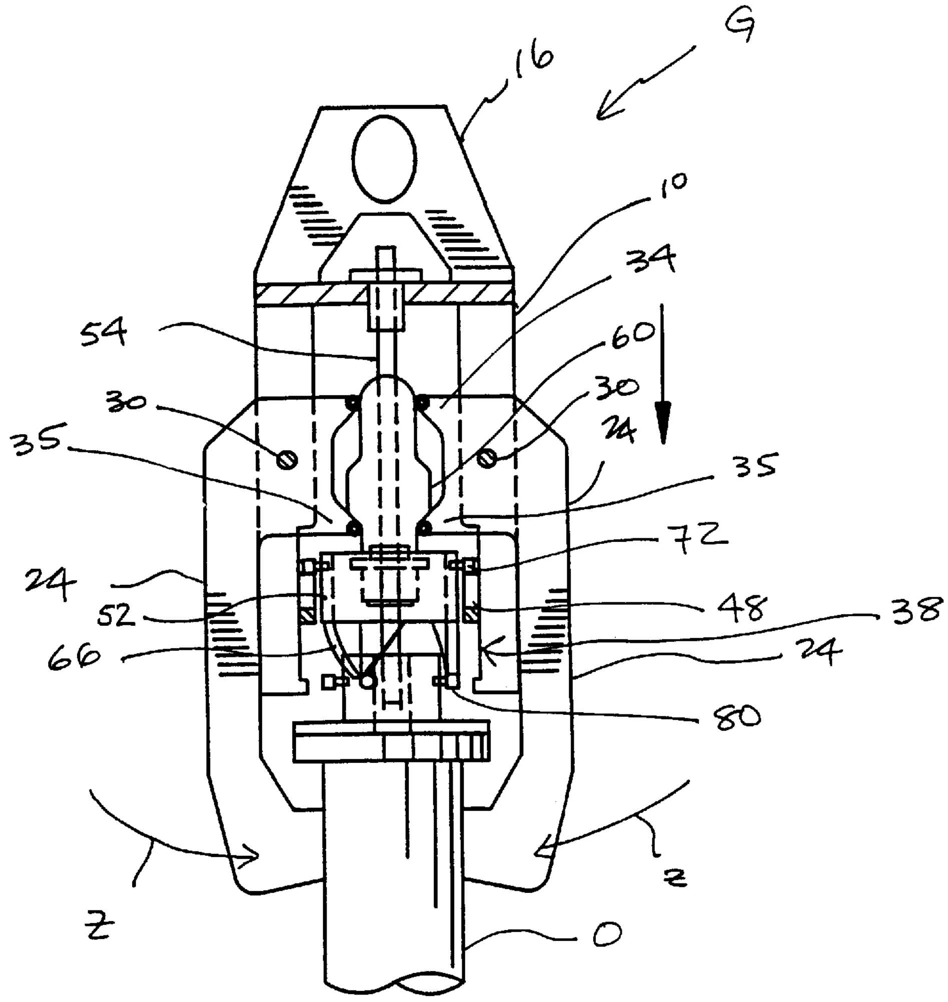

The grapple G continues its downward movement and the plunger 74 begins to move upwardly such that the contact members 66 now engage the bearings 80 (FIGS. 7 and 7A). The grapple G continues to move further downwardly and the plunger 74 continues to move upwardly thereby pushing the actuator assembly 38 upwardly. The upward motion of the actuator assembly 38 causes the jaws 24 to move towards the object O and assume a closed position (shown by arrows Z). In particular, as the grapple G moves from the position shown in FIG. 7 to the position shown in FIG. 8, the lower contact portions 35 of the jaws 24 ride down the larger diameter cam section 60 and ramp 64 to engage the smaller diameter section 62. As a result of the cam section 60, the jaws 24 pivot towards each other to assume the closed position shown in FIG. 8.

Figure 8A:
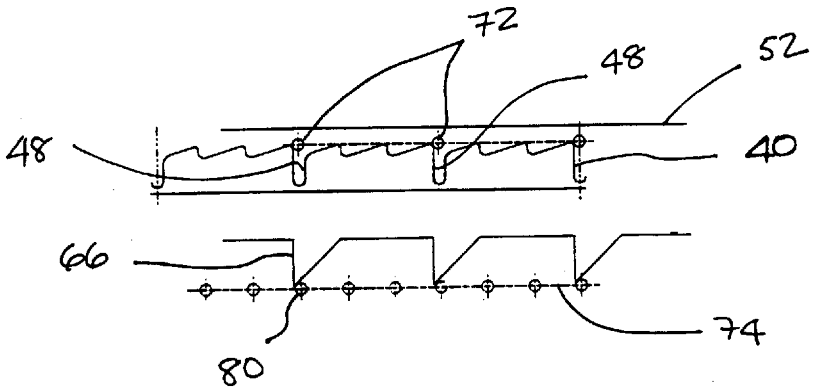
Figure 9:
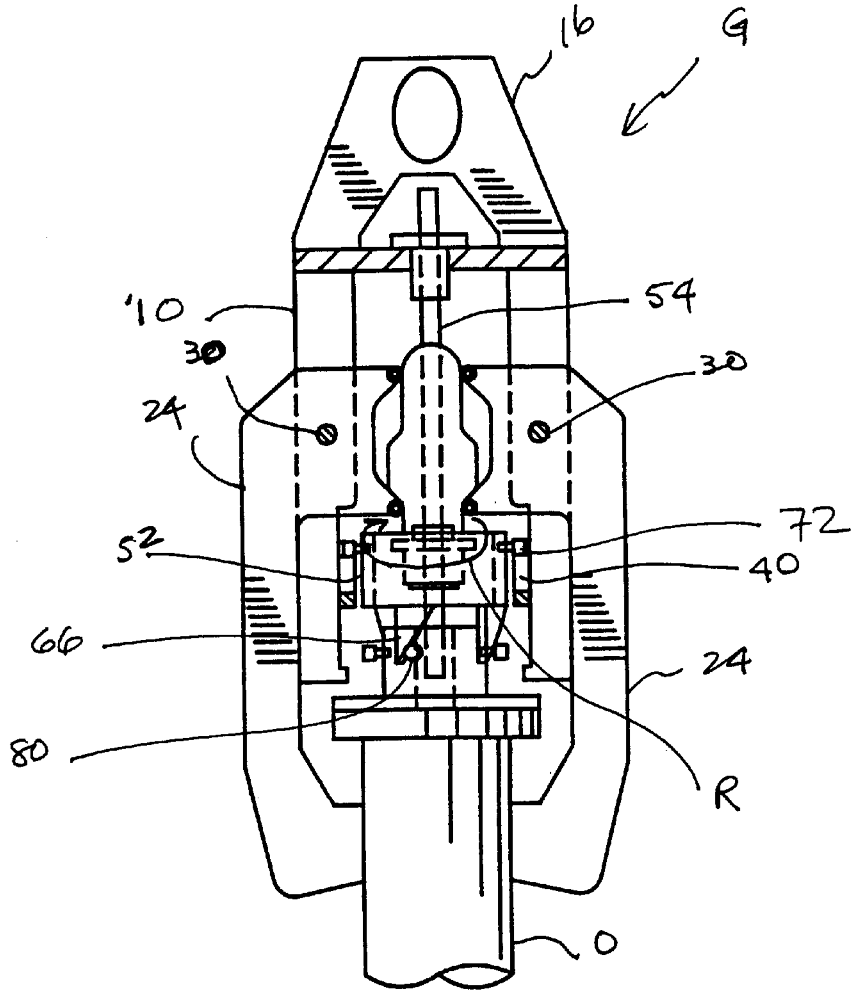
Figure 9A:
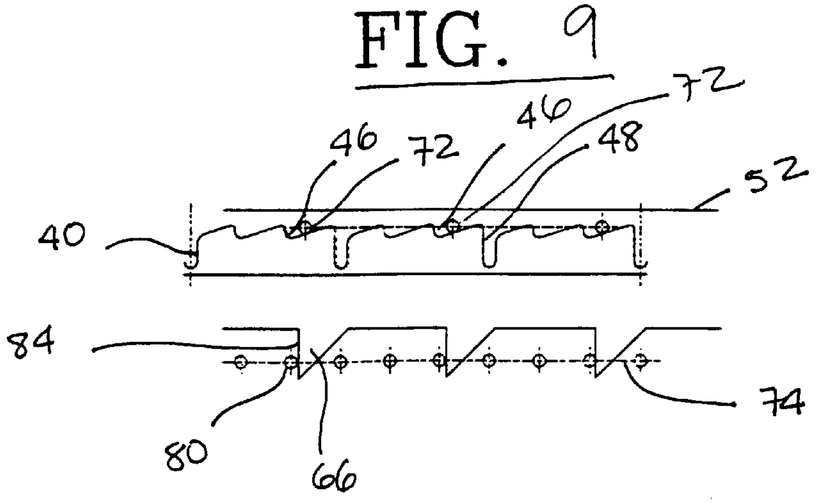
Figure 11:
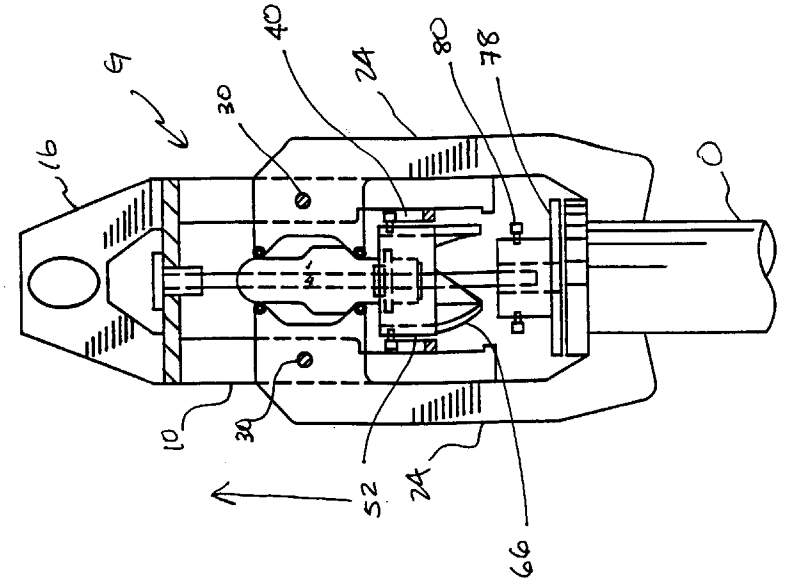
Figure 10:
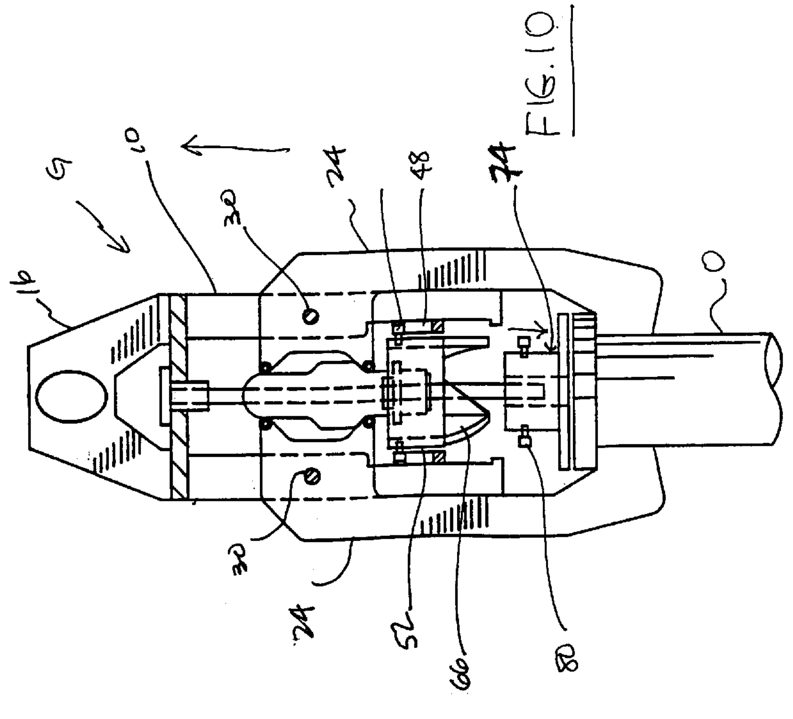
Figure 10A:
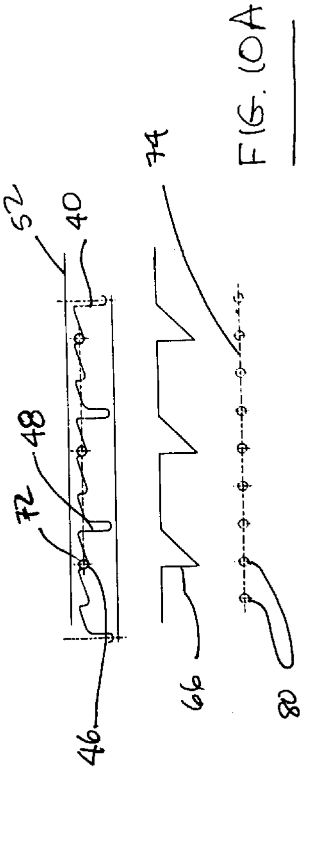

As shown in FIG. 8A, the rotator bearings 72 slide out of the corresponding deep grooves 48. Once the rotator bearings 72 are out of the corresponding deep grooves 48, the rotator 52 begins to rotate (see arrow R in FIG. 9) such that the bearings 72 move into the shallow grooves 46 (FIG. 9A). A free rotation of the rotator 52 is prevented due to the straight edges 84 of the contact members 66 coming into engagement with the corresponding adjacent plunger bearings 80 (FIG. 9A). Upon reaching this position, the grapple G is lifted upwardly and the rotator bearings 72 come to rest in the shallow grooves 46 (FIG. 10A). At this point, the plunger 74 starts to lose contact with the object O, and the contact members 66 disengage with the respective plunger bearings 80 (FIGS. 10 and 10A). The grapple G is further moved upwardly and moved to a desired location, where the grapple G self-actuates upon lowering by repeating the above-mentioned sequence in reverse order to thereby open the jaws to release the object O.

As can be seen from the above, the grapple G of the present invention is actuated by its own weight and no active components (springs, motors, hydraulics, etc.) are required.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims. It is further understood that the present invention is not limited to the claims appended hereto.

What is claimed is:

1. A self-actuating mechanical grapple for lifting and handling an object, comprising:

a support housing including upper and lower portions and defining an internal recess;

said lower portion including a bottom opening communicating with said recess;

a plurality of jaws including first end portions connected to said housing and second end portions remaining free for engaging an object, said jaws being pivotable between open and closed positions;

an actuator member slidably positioned in said recess for opening and closing said jaws;

said actuator member including a cam portion in operative engagement with the first end portions of said jaws to cause said jaws to pivot when said actuator member is moved axially relative to said housing;

said actuator member including a rotatable member with at least one contact member;

a locking member fixedly mounted to the internal surface of said housing and cooperating with said rotatable member;

said locking member including grooves defining open and closed positions of said jaws;

a plunger member axially movable in said housing for contacting an object; and said plunger member including at least one stud member for immovably engaging said contact member of said actuator member.

2. The mechanical grapple of claim 1, wherein:

said actuator member includes an axially extending upper cylindrical portion of a first diameter;

said cylindrical portion includes said cam portion of a second diameter larger than said first diameter; and a ramp extending between said cylindrical portion and said cam portion.

3. The mechanical grapple of claim 2, wherein:

said first end portions of each of said jaws includes a contact portion slidably engaging said cylindrical portion.

4. The mechanical grapple of claim 1, wherein:

said locking member includes a series of repeating units of grooves; and at least one of said unit includes a deep and a shallow groove.

5. The mechanical grapple of claim 4, wherein:

said deep and shallow grooves define open and closed positions of said jaws, respectively.

6. The mechanical grapple of claim 4, wherein:

said locking member includes a ring-shaped member having a top surface; and said grooves are provided on said top surface.

7. The mechanical grapple of claim 6, wherein:

said rotatable member includes at least one radially extending stud member for riding in said grooves.

8. The mechanical grapple of claim 7, wherein:

said contact member includes a generally triangularly-shaped member with a generally straight and an inclined contact edge.

9. The mechanical grapple of claim 8, wherein:

a plurality of said contact members are arranged about the periphery of said rotatable member; and a plurality of radially extending stud members are arranged about the periphery of said plunger member.

10. The mechanical grapple of claim 9, wherein:

three of said jaws are equilaterally arranged about the periphery of said housing; and said free second end portions of said jaws extend below the lower portion of said housing.

11. The mechanical grapple of claim 1, wherein:

said actuator member, said locking member, and said plunger member are concentrically arranged in the internal recess of said housing.

12. A self-actuating mechanical grapple for lifting and handling an object, comprising:

a support housing having an open bottom and defining an internal recess;

a plurality of radially outwardly extending jaws pivotably mounted to said housing at first end portions thereof and including free second lower end portions for engaging an object;

said jaws being equilaterally arranged about the periphery of said housing;

an actuator member positioned concentrically in the recess of said housing for opening and closing said jaws;

said actuator member including an axially extending upper cam portion in operative engagement with the first end portions of said jaws to cause said jaws to pivot when said actuator member is moved axially relative to said housing;

said actuator member including a lower rotatable member with at least one contact member;

a locking member fixedly mounted to the internal surface of said housing and cooperating with said rotatable member;

said locking member comprising a generally ring-shaped member positioned concentrically in the recess of said housing;

said locking member including grooves defining open and closed positions of said jaws;

a plunger member concentric with and axially movable in said housing;

said plunger member including a shaft extending upwardly towards the top of said housing and an engagement member for contacting an object; and said plunger member including at least one radially extending stud member for immovably engaging said contact member when said plunger member moves axially upwardly in said housing.

13. The mechanical grapple of claim 12, wherein:

said actuator member includes a first axially extending cylindrical portion of a first diameter;

said cam portion comprises a second axially extending cylindrical portion of a second diameter larger than said first diameter; and a ramp extending between said first and second cylindrical portions.

14. The mechanical grapple of claim 13, wherein:

said first end portions of said jaws each includes a contact portion slidably engaging said first and second cylindrical portions.

15. The mechanical grapple of claim 12, wherein:

said locking member includes a series of repeating units of grooves; and at least one of said units includes a deep and a shallow groove.

16. The mechanical grapple of claim 15, wherein:

said deep and shallow grooves define the open and closed positions of said jaws, respectively.

17. The mechanical grapple of claim 16, wherein:

said ring-shaped member includes a top surface; and said grooves are provided on said top surface.

18. The mechanical grapple of claim 16, wherein:

said rotatable member includes at least one radially extending stud member for riding in said grooves.

19. The mechanical grapple of claim 18, wherein:

said contact member includes a generally triangularly-shaped member with a generally straight and an inclined contact edge.

20. The mechanical grapple of claim 19, wherein:

a plurality of said contact members are equilaterally arranged about the periphery of said rotatable member; and a plurality of said stud members are provided about the periphery of said plunger member.

* * * * *